No. 662,252. Patented Nov. 20, 1900.
I. O. CROSSCUP.
FILTERING APPARATUS.
(Application filed July 18, 1900.)
(No Model.)
*Fig. I*
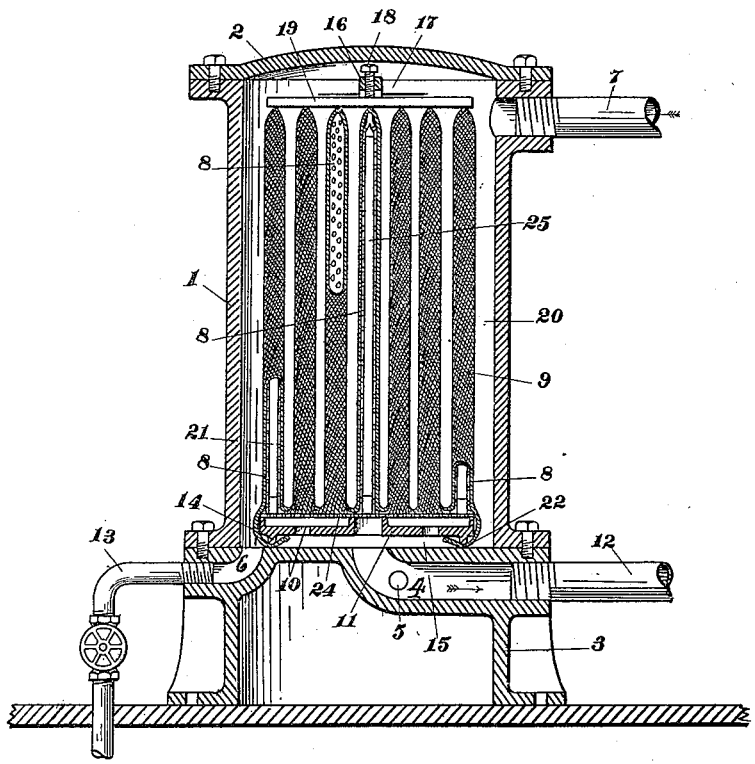
*Fig. II*
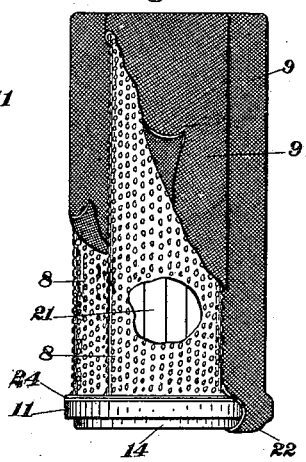
*Fig. III*
*Fig. IV*
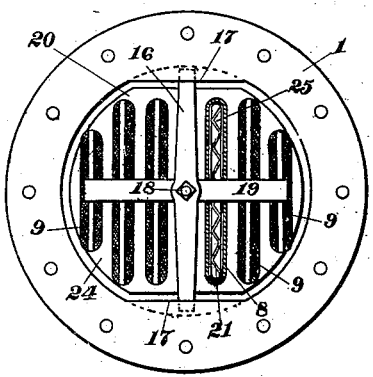
WITNESSES:
PH Lander
Elmer Wickes
INVENTOR
Ira O Crosscup
BY J Richards &Co
ATTORNEY

UNITED STATES PATENT OFFICE.

IRA O. CROSSCUP, OF SAN FRANCISCO, CALIFORNIA.

FILTERING APPARATUS.

SPECIFICATION forming part of Letters Patent No. 662,252, dated November 20, 1900.

Application filed July 18, 1900. Serial No. 24,074. (No model.)

*To all whom it may concern:*

Be it known that I, IRA O. CROSSCUP, a citizen of the United States of America, residing at San Francisco, county of San Francisco, and State of California, have invented certain new and useful Improvements in Filtering Apparatus; and I hereby declare the following to be a full, clear, and exact description of the same, reference being had to the accompanying drawings, forming a part of this specification.

My invention relates to filters, and especially to devices for extracting oil or other oleaginous substances from the supply-water for steam-boilers, commonly called "oil-filters," and to certain useful improvements in such apparatus.

My improvements consist in a series of flat conduits, hereinafter called "forms," oblong in section, made of thin metal profusely perforated and covered with a fibrous or felted fabric, the whole so disposed within a main containing vessel as to secure a large amount of filtering area in proportion to the cubic space occupied. It also consists in various constructive features hereinafter more fully explained and illustrated by drawings herewith, forming a part of this specification.

The objects of my invention are to attain within a given cubic space the greatest possible amount of filtering area, to permit convenient removal and replacement of the filtering devices, to permit convenient cleansing of the filtering material in place, and to secure an efficient performance of such apparatus.

Referring to the drawings, Figure I is an elevation in section of an oil-filter constructed according to my invention. Fig. II is an inverted or bottom view of a removable plate on which the filter-forms are mounted. Fig. III is a side view of the filter-forms opposite to Fig. I, showing them with a portion of their fibrous or felt covering removed. Fig. IV is an end or top view of the main containing vessel, one of the forms being shown in section.

In the construction of oil-filters there has been a continued effort to amplify the catchment-surfaces by disposing these as closely together as the construction would permit, especially for sea service, but not to a reduction of the area of the conduits for the water after it has passed through the filtering substance. This latter is an especial feature of my invention now to be explained.

The main containing vessel 1 I show of a circular section, which is preferable in the case of high pressure now common in condensing-steam machinery; but this vessel can be rectangular, polygonal, or of any suitable form in cross-section. This vessel 1 is provided with a removable cover 2 and is mounted on a chambered base 3, having passages 4, 5, and 6 for water and steam, as hereinafter explained.

The supply-water from a force-pump or other source of water under pressure enters the vessel 1 by the pipe 7, is diffused among the filtering-forms 8 and driven through the fibrous or felt covering 9 and through the small perforations into the interior of these forms 8, and drains down through perforations in the plates 24 and 11 to the chamber 4 and passes out through the pipe 12 to the boiler. In passing through the felt or fibrous covering 9 the oil or grease in the water is arrested thereby, the pure water passing through the perforations into the forms 8, as before explained, and when the covering 9 becomes saturated with grease or oil the pipes 7 and 12 are closed and live or hot steam is turned into the passage 4 through an inlet-way 5 and flows up into and heats the forms 8 and the covering 9, softening and removing the collected oil or grease therefrom, so it will flow down to the bottom of the main vessel 1 and be discharged through the pipe 13 to a vessel to catch the oil, or this pipe can be connected with the blow-off or other wasteway. When the filtering-covering 9 is sufficiently cleansed, the pipe 13 and steamway 5 are closed, the water-pipes 7 and 12 are again opened, and the filter resumes its regular action.

The forms 8 are made of thin sheet metal, such as tin, and are profusely perforated, as seen in Fig. III. They are made with narrow apertures 25 just large enough for the free passage of the water and are attached by any suitable means, as by soldering, to a perforated bottom plate 24, communicating with the apertures 10 in the removable base part 11. The forms 8, with the plate 24, to which they are attached, are held down on the base part by means of a clamp-bar 16, that engages under the ledges 17, a screw 18, and a bearing-bar 19, so that by removing the covering 2, loosening the screw 18, and turning the clamp-bar 16 clear of the ledges 17 these clamping devices can be removed and the forms 8, with plate 24, lifted out and replaced without disturbing the other parts of the apparatus.

When water and steam are suddenly turned into the main chamber 20, it meets with some resistance in passing through the fibrous or felt covering 9 and tends to collapse the flat forms 8. This I provide for by inserting corrugated plates of thin metal 21, bent into a zigzag form, as shown in Fig. IV. These supporting-plates 21 are inserted before the forms 8 are attached to this plate 24 and are preferably fastened in place by dipping the whole into a melted soldering compound, which secures all the parts together.

The fabric 9 is prepared to fit smoothly over the forms 8 and at the bottom to lap under the base part 11, as seen at 22 in Figs. I and III, forming there a close joint.

Having thus explained the nature and objects of my invention and manner of applying the same, I claim as new and desire to secure by Letters Patent—

1. In oil-filtering apparatus, a main containing vessel attached to a chambered base 3 having passages for water and steam, a series of closely-perforated forms surrounded by a fabric covering and attached to a removable base-plate 24 that connects the series of forms, holds them in their position relatively and permits their removal bodily from the main containing vessel, substantially as specified.

2. In oil-filtering apparatus, a main containing vessel, a chambered base thereunder and a removable cap on the top, a series of perforated hollow forms of sheet metal, of thin section, open at the bottom and attached to a perforated base-plate 24, a subbase part 11 perforated, chambered on its lower side, the whole held down on the main base 3 by a removable clamp at the top of the main containing vessel, substantially as specified.

3. In filtering apparatus, a main containing vessel, passages thereto for water and steam and therein a series of perforated hollow forms 8, set vertically, open at the bottom and covered with a filtering fabric that fits over the forms and covers the perforations therein, substantially as specified.

4. In an oil-filter, a main containing vessel, steam and water connections thereto and therein a series of perforated hollow flat forms 8, set vertically, open at the bottom and provided with the corrugated staying-plates 21 to prevent them from collapsing by external pressure, substantially as specified.

5. In filtering apparatus, the main containing vessel 1, the perforated flat forms 8 joined to a base-plate and covered with filtering fabric, a subbase 3 for the main vessel provided with passages and connections whereby steam can be driven through the perforated flat forms and the filtering fabric thereon, substantially as specified.

In testimony whereof I have signed my name to this specification in the presence of two subscribing witnesses.

IRA O. CROSSCUP.

Witnesses:
ALFRED A. ENQUIST,
J. RICHARDS.